United States Patent [19]
Thillet

[11] 3,713,559
[45] Jan. 30, 1973

[54] CYLINDRICAL VESSEL ADAPTED TO BE SUBJECTED TO INTERNAL PRESSURE

[75] Inventor: Georges Thillet, Grenoble, France
[73] Assignee: B. V. S., Grenoble, France
[22] Filed: Feb. 2, 1971
[21] Appl. No.: 111,816

[52] U.S. Cl..................................220/3, 220/55 AN
[51] Int. Cl............................................................F25j
[58] Field of Search ....220/3, 55 R, 39, 46 P, 46 MS, 220/55 AN, 55 UD; 23/290

[56] References Cited

UNITED STATES PATENTS

| | | | |
|---|---|---|---|
| 3,313,599 | 4/1967 | Boon | 220/3 X |
| 3,062,401 | 11/1962 | Needham | 220/46 P |
| 2,761,279 | 9/1956 | Smith | 220/55 R |
| 3,278,070 | 10/1966 | Pangburn | 220/55 R |
| 3,587,905 | 6/1971 | McFarland | 220/3 |

Primary Examiner—Joseph R. Leclair
Assistant Examiner—James R. Garrett
Attorney—Cameron, Kerkam & Sutton

[57] ABSTRACT

A cylindrical vessel adapted to be subjected to internal pressure comprising a cylindrical member and two end closures, the end closures being concave with respect to the vessel interior and each being supported by a bearing member contacting substantially the whole of the exterior of the closure, each bearing member contacting a surface of a retaining member secured to the cylindrical member such that the resultant of the pressures exerted on a sectoral element of the bearing member has the same line of action as the reaction forces at the surface of contact of that sectoral element of the bearing member with a corresponding sectoral element of the retaining member.

7 Claims, 2 Drawing Figures

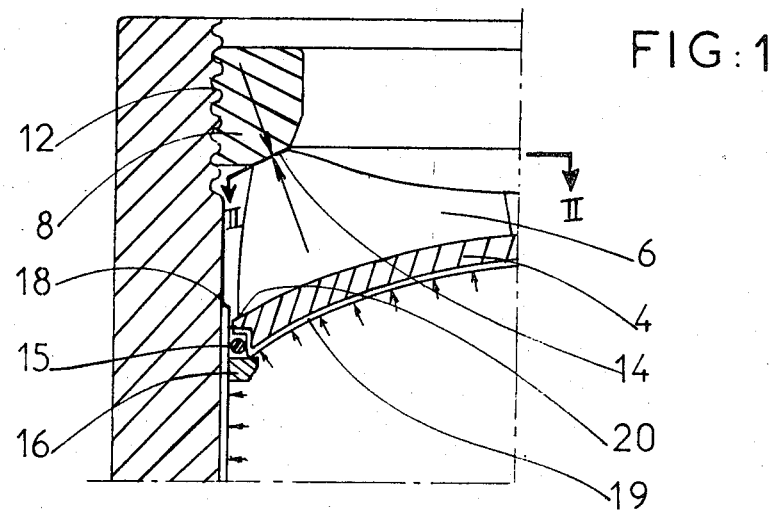
FIG.1
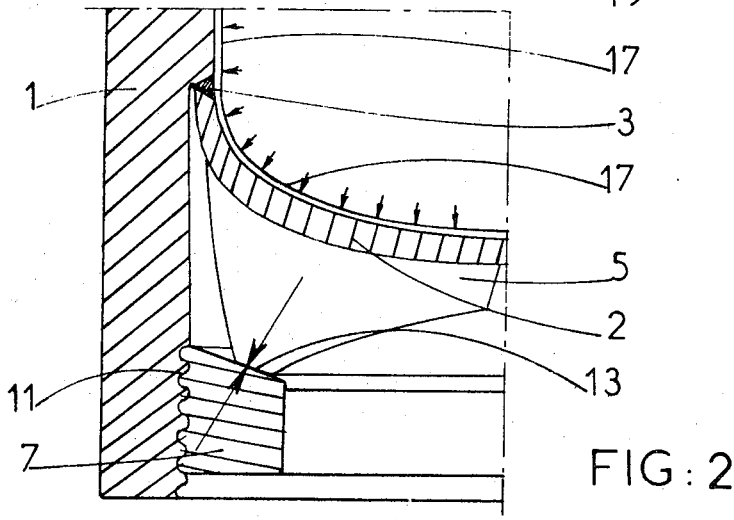
FIG.2
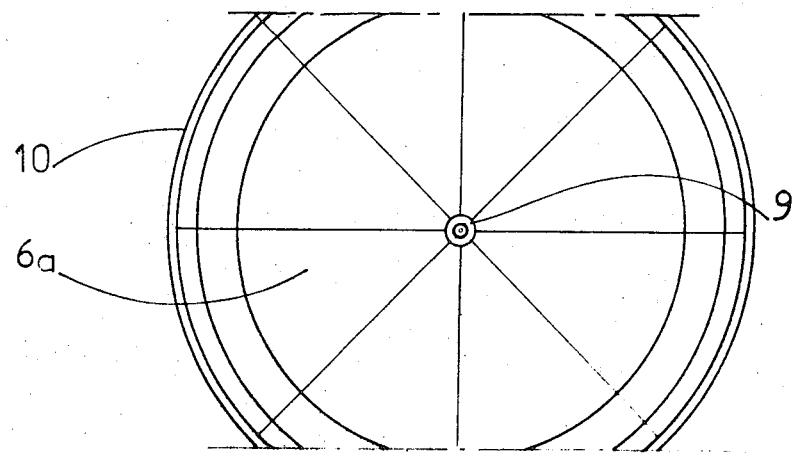

CYLINDRICAL VESSEL ADAPTED TO BE SUBJECTED TO INTERNAL PRESSURE

The invention concerns improvements in and relating to cylindrical vessels to be subjected to internal pressure.

Large diameter end closures for cylindrical vessels of this type have been designed as very heavy components in order that they shall be able to withstand high internal pressures, and it is difficult, sometimes even impossible, to make such end closures, either on account of their weight or on account of the technical impossibility of making their material sufficiently homogeneous.

A requirement of an end closure for a pressurized cylindrical vessel is that it must have sufficient mechanical strength to resist the internal pressures and the reactions from any support provided for it. Also its surface in contact with the fluid contained therein must be impermeable and inert to this fluid under operating conditions.

An object of the invention is to provide an improved cylindrical body.

According to the invention, there is provided a cylindrical vessel adapted to be subjected to internal pressure comprising a cylindrical member, two end closures, at least one of the end closures being concave with respect to the interior of the vessel and being supported exteriorly by a bearing member in contact with the end closure from the axis of the vessel to adjacent the periphery of the end closure, a retaining member in contact with a surface of the bearing member on that side thereof remote from the one end closure, the retaining member being secured to the cylindrical member, and the arrangement being such that the resultant of the pressures exerted on a sectoral element of the bearing member will pass through the surface of contact between the retaining member and the bearing member.

The invention will now be described in more detail with reference to an embodiment thereof, given by way of example only and illustrated in the accompanying drawing, wherein:

FIG. 1 is an axial section through a cylindrical vessel under pressure, only the end parts of the vessel being shown; and FIG. 2 is a section along a line II—II of FIG. 1.

The pressurized cylindrical vessel shown in section in FIG. 1 comprises a cylindrical member 1, an end closure 2 welded to the body at 3, and a detachable end closure 4.

The end closures 2 and 4 are concave with respect to the interior of the cylindrical vessel. Each may be made from weldable steel, easily produced even in large sizes. Each of the end closures is supported by a bearing member 5 or 6 which in turn is in contact with a retaining member 7 or 8. Each bearing member 5 or 6 may be in one piece if the dimensions of the vessel are small. However, if its diameter is large, the bearing members may each be formed of a number of sectors, as shown in FIG. 2 for the closure 4. In this Figure the member 6 is shown as divided into a plurality of sectors 6a. The bearing member 5 may also be divided into sectors.

As FIG. 2 shows, the sectors 6a of the bearing member 6 extend substantially from the axis 9 of the cylindrical member 1 to the inner periphery 10 of the member.

The retaining members 7 and 8 are secured to the cylindrical member 1 by any appropriate means. In the embodiment shown in FIG. 1, they are secured by means of threads 11, 12. Instead of being in one piece, the retaining members 7, 8 may, like the bearing members 5 and 6, be divided into a number of segments, each extending over part of the periphery of the respective bearing member.

Each of the bearing members 5 or 6 contacts a surface 13 or 14 of the associated retaining member.

The arrangement of each end closure and bearing and retaining members is such that the resultant of the pressures exerted on a sectoral element of the bearing member 5 or 6 passes through the surface of contact between this bearing member and the associated retaining member 7 or 8.

Preferably, as in this embodiment, this resultant has the same line of action as the resultant of the forces due to contact between the corresponding element of the bearing member and of the associated retaining member.

As a result there will be zero moment acting on any element of the bearing member. In other words the resultant of the pressures exerted on a sectoral element of the end closure 2 or 4 will not, when transmitted to the corresponding sectoral element of the bearing member 5 or 6, tend to pivot the element of the bearing member 5 or 6. This element is perfectly balanced on the surface 13 or 14 of contact with the associated retaining member 7 or 8, and any element of the member 5, for example, will not pivot on the surface 13 because the resultant of the pressures passes through this surface 13, and because, additionally, this resultant has the same line of action as the reaction exerted on the element of the bearing member 5 by the retaining member 7.

Since the bearing members 5 and 6 extend from the center to the periphery of each of the closures 2 and 4, these closures are entirely supported.

The bearing members 5, 6 may be made from a high-carbon, high-tensile steel, which may be non-weldable. This does not matter because the bearing members for small receptacles can be made in one piece while those for large receptacles can be made from mutually independent sectors as shown in FIG. 2.

Preferably, as shown in FIG. 1, the resultant of the pressures on segmental elements of the closures is perpendicular to the surfaces of contact between the associated bearing members and retaining members.

If, as in the case of the removable end closure 4, the closure is not welded to the member 1, a seal 15 is provided between the closure 4 and the cylindrical wall 1. This closure 4 may rest on a circular shoulder 16 on the cylindrical member 1.

An internal seal is provided for the vessel by a sealing skin 17. In the case of the welded end closure 2, this skin may be continued on to the closure without interruption. In the case of the removable closure 4, the sealing skin 17 stops at 18 and the closure 4 itself is covered with a sealing skin 19, extending as far as the periphery 20 of the closure and passing around the seal 15.

Alternatively, this latter sealing skin may be omitted, in which case the member 1 of the vessel and the end closure 2 suffice to ensure fluid-tightness. The removable seal 15 may then be placed between the wall 1 and the removable closure 4.

The pressurized cylindrical vessel illustrated is made up of various elements which separate the different functions which are to be fulfilled:

Fluid-tightness is obtained by means of the sealing skins 17 and 19.

The dimensions of the end closures are too small for them to withstand the internal pressure alone. They can each be made in one piece and can be produced very easily since they do not require special metals and steels. They can be made from a plurality of elements welded to one another.

Mechanical strength for each end closure is provided by the combination of the bearing members 5 or 6, if required made as a plurality of mutually independent sectors and from special steels, with retaining members 7 or 8, the surface 13 or 14 of contact between the bearing members and retaining members being situated at a site through which the resultant of the pressures on sectoral elements of the end closures and the bearing members pass, and at the site through which the reactive forces of contact between the bearing members and the retaining members also pass.

With this arrangement, the bearing members support the end-plates 2 and 4 efficiently over their entire area. Also, since the bearing members do not pivot on the contact surfaces 13 and 14, the assembly is perfectly balanced and strong.

Obviously, the invention is not restricted by the details of the embodiment just described, which can be modified within the scope of the invention.

I claim:

1. A cylindrical vessel adapted to be subjected to internal pressure comprising a cylindrical member, two end closures for said member, at least one of said end closures being concave toward the interior of said vessel, a plurality of bearing members each having the form of a sector of a circle in contact with said one end closure from the principal axis of the vessel to adjacent the periphery of the said end closure, a retaining member in contact with a surface of each of said bearing members on that side thereof removed from said one end closure, each of said surfaces of contact of said bearing members being substantially frusto-conical with the apex of the cone thereof lying exteriorly of the vessel, said retaining member being secured to said cylindrical member, said one end closure, said bearing members and said retaining member transmitting the resultant of the pressure exerted on each of said bearing members to said cylindrical member through the surface of contact between said bearing member and said retaining member.

2. A vessel as claimed in claim 1 wherein said end closures and said cylindrical members are lined with a sealing skin.

3. A vessel as claimed in claim 1 wherein said resultant of the pressure exerted on each of said bearing members will be substantially perpendicular to said surface of contact.

4. A vessel as claimed in claim 1 wherein said resultant of the pressures exerted on each of said sectoral members will have substantially the same line of action as the resultant of the forces due to contact between said sectoral member and the corresponding portion of said retaining member.

5. A vessel as claimed in claim 1 wherein said retaining member is formed of a series of arcuate retaining member units each of which constitutes a part of the retaining member.

6. A vessel as claimed in claim 1 wherein said one end closure is welded to said cylindrical member.

7. A vessel as claimed in claim 1 wherein said one end closure is removable from said vessel, and a seal is provided between said one end closure and said cylindrical member.

* * * * *